United States Patent
Aizawa et al.

(10) Patent No.: US 7,295,538 B2
(45) Date of Patent: Nov. 13, 2007

(54) RADIO TRANSMISSION DEVICE AND TRANSMISSION RATE DECISION METHOD

(75) Inventors: Junichi Aizawa, Yokohama (JP); Hitoshi Iochi, Yokohama (JP); Kazuyuki Miya, Setagaya-ku (JP)

(73) Assignee: Matsushita Electric Industrial Co., Ltd, Osaka (JP)

( * ) Notice: Subject to any disclaimer, the term of this patent is extended or adjusted under 35 U.S.C. 154(b) by 170 days.

(21) Appl. No.: 10/544,476

(22) PCT Filed: Feb. 3, 2004

(86) PCT No.: PCT/JP2004/001088

§ 371 (c)(1),
(2), (4) Date: Aug. 4, 2005

(87) PCT Pub. No.: WO2004/071045

PCT Pub. Date: Aug. 19, 2004

(65) Prior Publication Data

US 2006/0203727 A1    Sep. 14, 2006

(30) Foreign Application Priority Data

Feb. 7, 2003  (JP) .............................. 2003-031539

(51) Int. Cl.
*H04Q 7/00*   (2006.01)
*H04B 17/00*  (2006.01)

(52) U.S. Cl. .................... 370/332; 370/333; 455/67.11

(58) Field of Classification Search ................ 370/232, 370/233, 252, 333, 332; 455/114.2, 452.1, 455/452.2, 63.1, 67.13, 501, 67.11
See application file for complete search history.

(56) References Cited

U.S. PATENT DOCUMENTS 6,366,763 B1    4/2002   Ue et al.
7,155,236 B2 *  12/2006  Chen et al. .................. 455/454

(Continued)

FOREIGN PATENT DOCUMENTS

EP           1011245        6/2000

(Continued)

OTHER PUBLICATIONS

PCT International Search Report dated Mar. 9, 2004.

(Continued)

*Primary Examiner*—Sonny Trinh
(74) *Attorney, Agent, or Firm*—Stevens, Davis, Miller & Mosher, LLP

(57) ABSTRACT

A base station apparatus (radio transmission apparatus) transmits a radio signal of data to a mobile terminal apparatus (communication apparatus of a transmission destination). The mobile terminal apparatus receiving the radio signal determines (ST1010) information (CQI) on a downlink transmission rate enabling reception in the mobile terminal apparatus based on reception quality such as CIR to transmit to the base station apparatus. The base station apparatus extracts a CQI value from the received radio signal, while obtaining likelihood of received data (ST1020), and corrects the CQI value based on the likelihood (ST1030). Then, based on the corrected CQI value, the base station apparatus determines a downlink transmission rate (ST1040). By this means, even when the radio transmission apparatus erroneously receives the transmission rate request transmitted from the communication apparatus of the transmission destination, the communication apparatus is prevented from erroneously receiving the data transmitted from the radio transmission apparatus.

15 Claims, 15 Drawing Sheets

U.S. PATENT DOCUMENTS

| | | |
|---|---|---|
| 7,170,928 B1 * | 1/2007 | Horneman et al. ......... 375/225 |
| 2001/0048675 A1 | 12/2001 | Nafie et al. |
| 2002/0097697 A1 * | 7/2002 | Bae et al. .................. 370/335 |
| 2002/0147953 A1 | 10/2002 | Catreux et al. |
| 2002/0151301 A1 | 10/2002 | Miyoshi |
| 2002/0181637 A1 | 12/2002 | Nakabayashi |
| 2003/0142656 A1 * | 7/2003 | Padovani et al. ........... 370/347 |
| 2004/0009786 A1 * | 1/2004 | Terry ......................... 455/522 |
| 2004/0022213 A1 * | 2/2004 | Choi et al. .................. 370/332 |
| 2004/0066754 A1 * | 4/2004 | Hottinen .................... 370/252 |
| 2004/0190486 A1 * | 9/2004 | Oshiba ....................... 370/349 |
| 2004/0246930 A1 * | 12/2004 | Fong et al. ................ 370/335 |
| 2005/0208973 A1 * | 9/2005 | Iochi .......................... 455/561 |
| 2006/0003702 A1 * | 1/2006 | Nibe et al. ................ 455/67.11 |
| 2006/0105717 A1 * | 5/2006 | Kwon et al. ............... 455/63.1 |

FOREIGN PATENT DOCUMENTS

| | | |
|---|---|---|
| EP | 1571762 | 9/2005 |
| JP | 2000 031944 | 1/2000 |
| JP | 2001 339330 | 12/2001 |
| JP | 2003 023659 | 1/2003 |
| JP | 2003 051781 | 2/2003 |

OTHER PUBLICATIONS

3GPP TS 25.214 v5.1.0 (Jun. 2002), 3rd Generation Partnership Project; Technical Specification Group Radio Access Network; Physical layer procedures (FDD) (Release 5), pp. 1-60.

3GPP TR 25.848 v4.0.0 (Mar. 2001), 3rd Generation Partnership Project; Technical Specification Group Radio Access Network; Physical layer aspects of UTRA High Speed Downlink Packet Access (Release 4), pp. 1-89.

Supplementary European Search Report dated Feb. 1, 2006.

* cited by examiner

RADIO TRANSMISSION DEVICE AND TRANSMISSION RATE DECISION METHOD

TECHNICAL FIELD

The present invention relates to a radio transmission apparatus used in a wireless communication system for performing high-speed packet transmission, and to a method of determining a downlink transmission rate used in the apparatus.

BACKGROUND ART

Developed in the field of wireless communications are systems where a radio transmission apparatus transmits packets at high speed to a communication apparatus that is a transmission destination of the packets, and particularly, downlink high-speed packet transmission systems where a plurality of mobile terminal apparatuses shares a high-speed large-capacity downlink channel, and a base station apparatus transmits packets to the mobile terminal apparatuses. Among the downlink high-speed packet transmission, as a higher packet transmission system of IMT-2000, the system called HSDPA (High Speed Downlink Packet Access) is considered for the purpose of increasing the downlink peak transmission speed, decreasing transmission delay, and achieving high throughput and the like. As techniques constituting HSDPA, disclosed in 3GPP (3rd Generation Partnership Project) is the transmission system called AMC (Adaptive Modulation and Coding) (see 3GPP TR25.848 "Physical layer aspects of UTRA High Speed Downlink Packet Access).

The AMC technique is to vary adaptive modulation parameters such as the M-ary number, error correcting coding rate and the like adaptively at high speed corresponding to variations in channel quality. In the AMC technique, as the channel quality is higher, the transmission rate can be increased by using a large M-ary number and high coding rate. More specifically, each mobile terminal apparatus measures downlink propagation path environments whenever necessary, and transmits an adaptive modulation request (CQI: Channel Quality Indicator) based on the measurement result to a base station apparatus. The CQI corresponds to a pair of adaptive modulation parameters. Based on the CQI, the base station apparatus determines a mobile terminal apparatus that is a transmission destination of transmission data, concurrently determines an optimal transmission rate, and transmits the transmission data.

Considered as the adaptive modulation parameters are the M-ary number (for example, switching between QPSK (Quaternary Phase Shift Keying) and 16QAM (Quadrature Amplitude Modulation)), coding rate (for example, performing turbo coding at $R=\frac{1}{3}$ and varying by puncturing or repetition) and the like. Meanwhile, used as the channel quality information is, for example, CIR (Carrier to Interference Ratio), SIR (Signal to Interference Ratio), transmit power of a dedicated channel (for example, DPCH (Dedicated Physical Channel)), and the like.

However, in the conventional system, when the base station apparatus erroneously receives the CQI transmitted from a mobile terminal apparatus, and transmits downlink data to the mobile terminal apparatus at a transmission rate determined based on the erroneously received CQI, the mobile terminal apparatus also erroneously receives the data because the data is transmitted at a transmission rate different from the requested one, and as a result, repeats retransmission of data, and there arises a problem of decreasing the throughput. In particular, although the mobile terminal apparatus transmits a request for a low transmission rate i.e. request for a low value of CQI (low CQI), when the base station apparatus erroneously receives the request as a high transmission rate i.e. request for a high value of CQI (high CQI), and transmits data to the mobile terminal apparatus at a high transmission rate based on the erroneous CQI, the mobile terminal apparatus does not meet the quality required of the transmitted high transmission rate, and there is a high possibility of erroneously receiving the data.

DISCLOSURE OF INVENTION

In a communication system where a radio transmission apparatus determines a transmission rate of transmission data based on a transmission rate request transmitted from a communication apparatus that is a transmission destination of a packet, when the radio transmission apparatus erroneously receives a transmission rate request, since the transmission apparatus transmits downlink data at a transmission rate determined based on the erroneously received transmission rate request, a possibility is high for the communication apparatus to erroneously receive the data. Accordingly, the reliability of a transmission rate request received in the radio transmission apparatus is an important factor to maintain good communication environments in the communication system.

The inventor noticed this respect, found out that it is possible to maintain good communication environments by evaluating the reliability of a transmission rate request received in the radio transmission apparatus using likelihood of data received in the radio transmission apparatus, and correcting the transmission rate request to a lower request when the reliability of the transmission rate request is low, and reached the present invention. Herein, the likelihood of the received data includes a soft-decision value, reception SIR, reception level and the like.

In other words, it is an object of the present invention to prevent a communication apparatus from erroneously receiving data transmitted from a radio transmission apparatus even when the radio transmission apparatus erroneously receives a transmission rate request (CQI) transmitted from the communication apparatus that is a transmission destination of a packet, and to maintain the throughput of the entire communication system.

The object is achieved by the radio transmission apparatus correcting the received transmission rate request based on the likelihood of received data, and determining a downlink transmission rate based on the corrected transmission rate request.

In descriptions hereinafter, it is assumed that the radio transmission apparatus is a base station apparatus, and that the communication apparatus of the transmission destination is a mobile terminal apparatus. More specifically, as shown in FIG. 1, the base station apparatus transmits a radio signal of data to the mobile terminal apparatus. The mobile terminal apparatus receiving the radio signal determines (ST1010) information (CQI) on a downlink transmission rate enabling reception in the terminal apparatus based on reception quality such as CIR to transmit to the base station apparatus. The base station apparatus extracts a CQI value from the received radio signal, while obtaining likelihood of received data (ST1020), and corrects the CQI value based on the likelihood (ST1030). Then, based on the corrected CQI value, the base station apparatus determines a downlink transmission rate (ST1040). Thus, since the base station apparatus transmits downlink data at a low transmission rate determined from the corrected CQI, an error rate of received data is decreased in the mobile terminal apparatus.

BEST MODE FOR CARRYING OUT THE INVENTION

Embodiments of the present invention will specifically be described below with reference to accompanying drawings.

Embodiment 1

Figure 1:
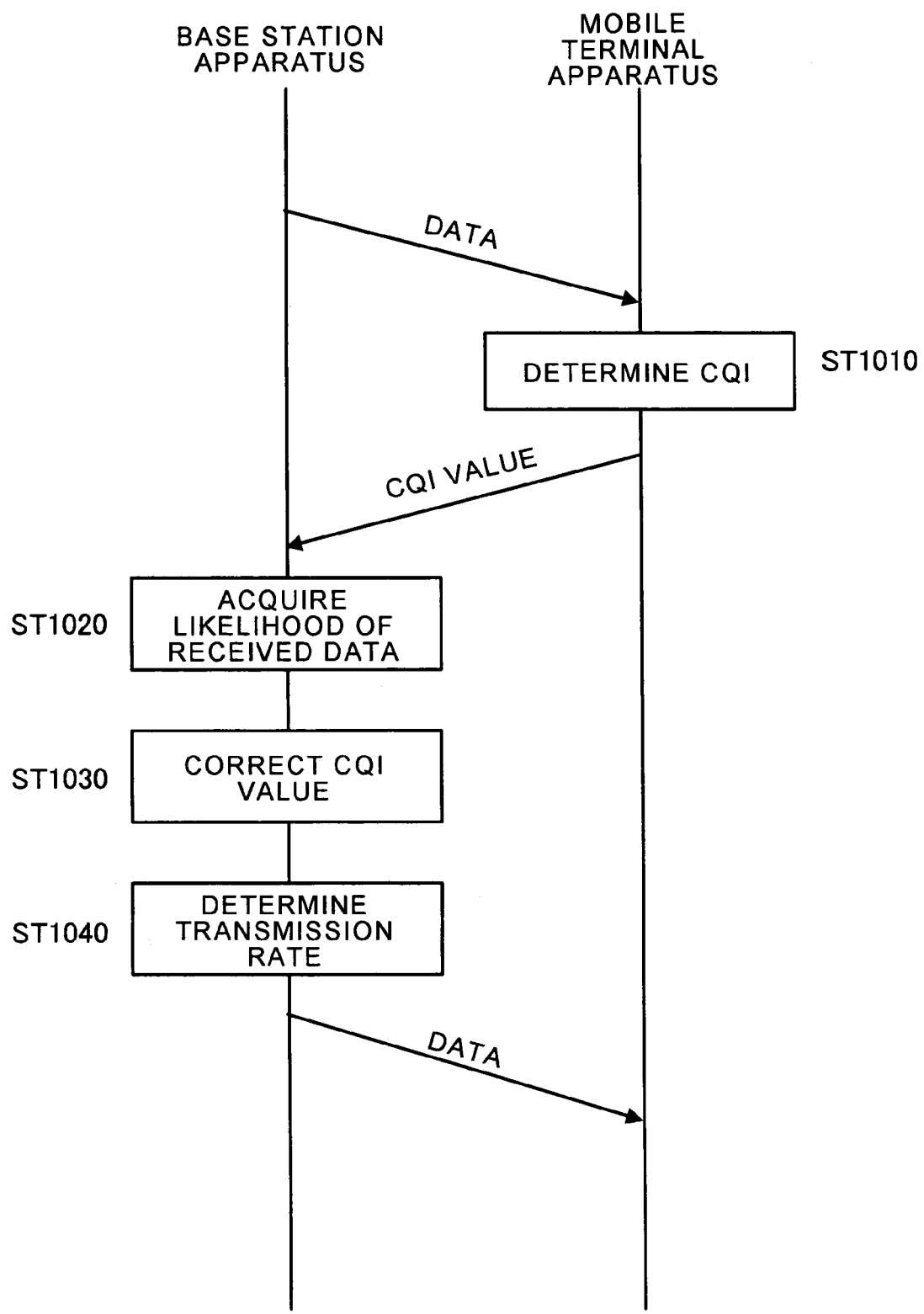
FIG. 1 is a diagram to explain a general outline of the invention.
Figure 2:
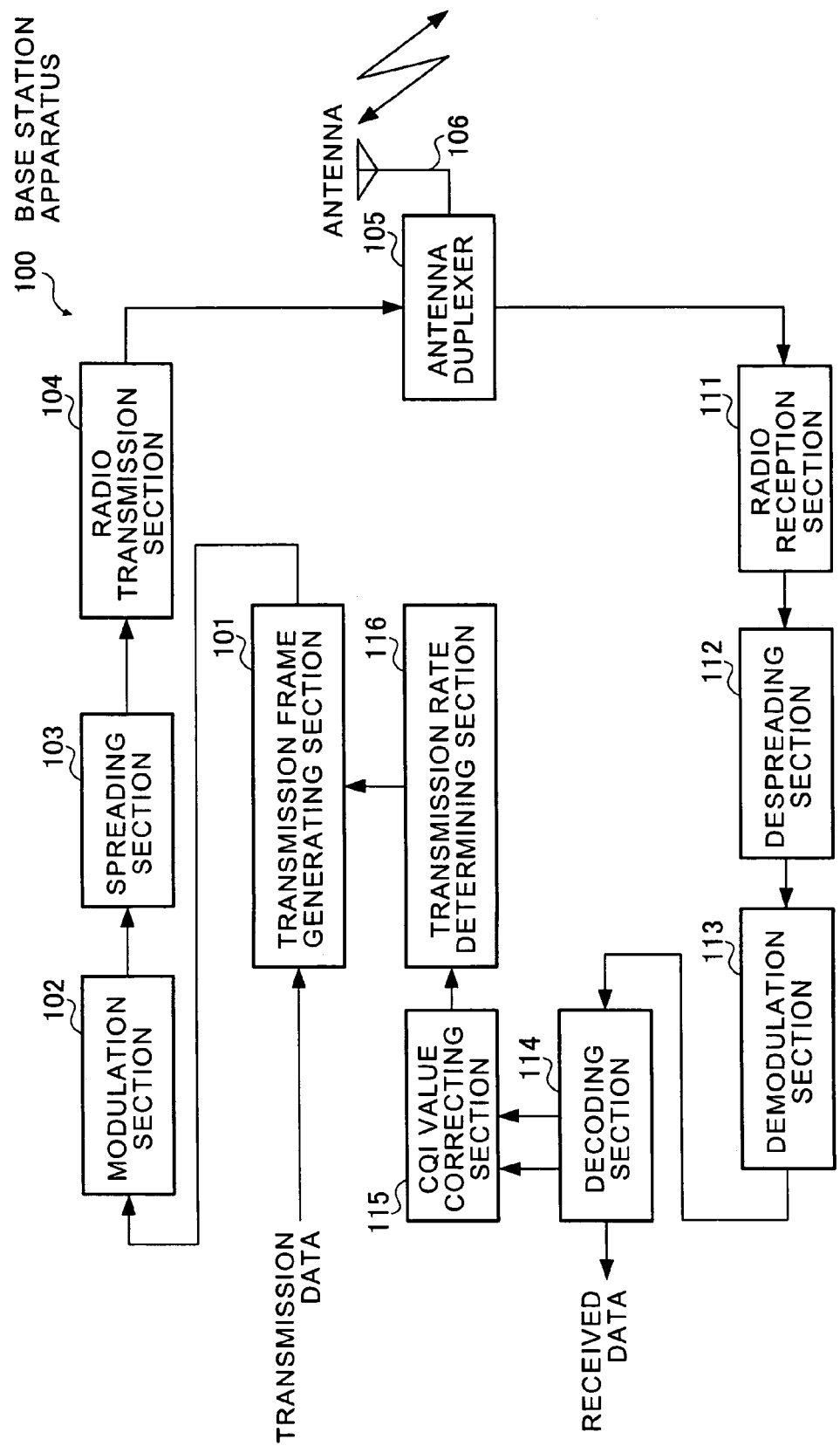
FIG. 2 is a block diagram illustrating a configuration of a base station apparatus according to Embodiment 1 of the invention.
Figure 3:
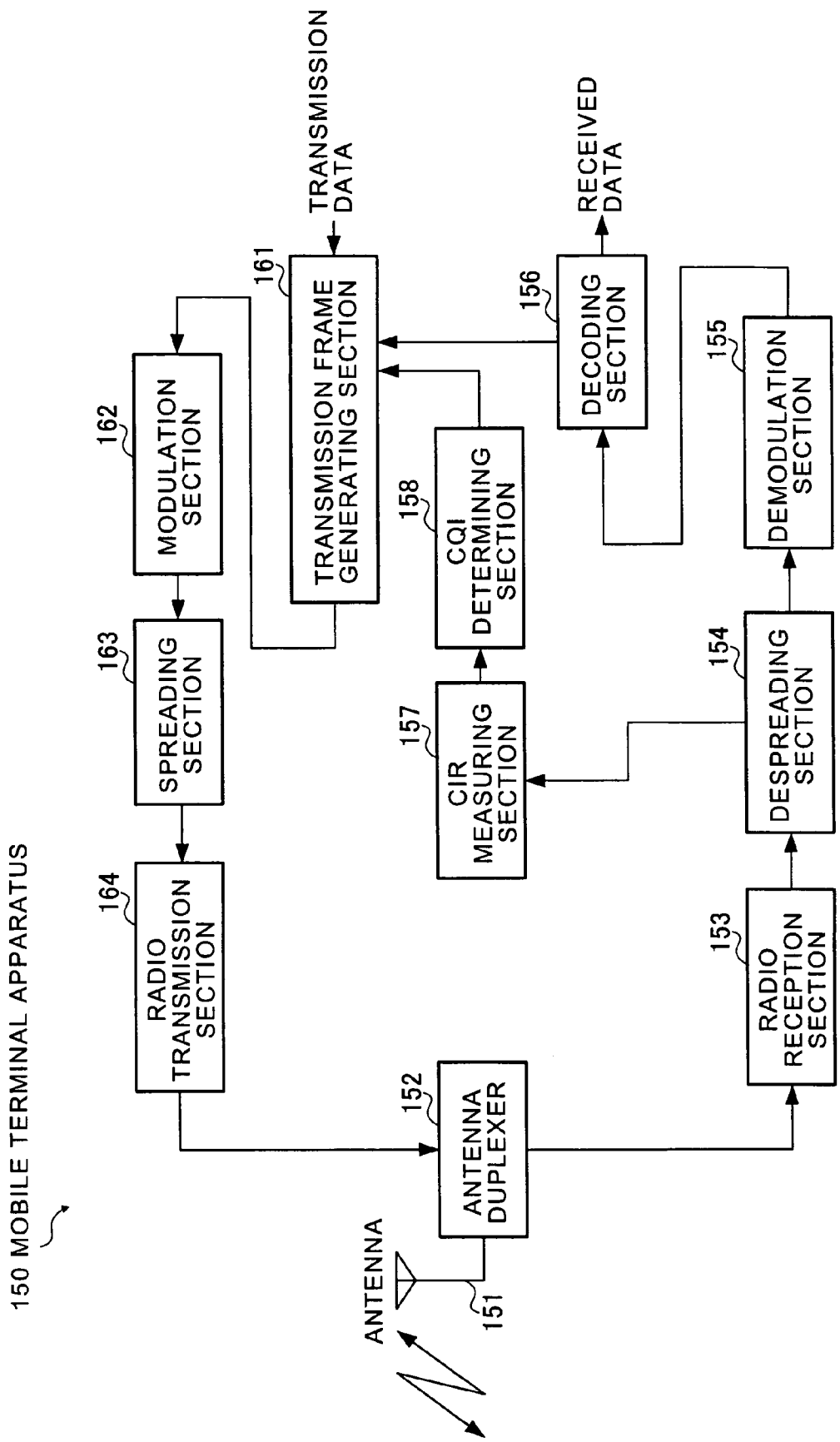
FIG. 3 is a block diagram illustrating a configuration of a mobile terminal apparatus according to Embodiment 1 of the invention.

FIG. 2 is a block diagram illustrating a configuration of base station apparatus 100 according to Embodiment 1 of the invention, and FIG. 3 is a block diagram illustrating a configuration of mobile terminal apparatus 150. Herein, a case is explained as an example where a soft decision value is used as likelihood of received data. In addition, the soft decision value represents amplitude information, phase information, amplitude information and phase information, Euclidean distance from a reference signal point and like after despreading.

In FIG. 2, base station apparatus 100 has transmission frame generating section 101, modulation section 102, spreading section 103, radio transmission section 104, antenna duplexer 105, antenna 106, radio reception section 111, despreading section 112, demodulation section 113, decoding section 114, CQI value correcting section 115 and transmission rate determining section 116.

In FIG. 3, mobile terminal apparatus 150 has antenna 151, antenna duplexer 152, radio reception section 153, despreading section 154, demodulation section 155, decoding section 156, CIR measuring section 157, CQI determining section 158, transmission frame generating section 161, modulation section 162, spreading section 163 and radio transmission section 164.

In base station apparatus 100, transmission frame generating section 101 generates a transmission frame from transmission data to output to modulation section 102. Modulation section 102 modulates a signal output from transmission frame generating section 101 to output to spreading section 103. Spreading section 103 performs spreading on the modulated signal to output to radio transmission section 104. Radio transmission section 104 performs predetermined radio processing on the spread signal, and transmits the signal to mobile terminal apparatus 150 via antenna duplexer 105 and antenna 106.

In mobile terminal apparatus 150, radio reception section 153 receives the radio signal transmitted from base station apparatus 100 via antenna 151 and antenna duplexer 152, and performs predetermined radio processing on the signal to output to despreading section 154. Despreading section 154 performs despreading on the signal output from radio reception section 153 to output to demodulation section 155 and CIR measuring section 157. Demodulation section 155 demodulates the signal output from despreading section 154 to output to decoding section 156. Decoding section 156 decodes the demodulated signal and obtains received data. CIR measuring section 157 measures CIR of the signal output from despreading section 154 to output to CQI determining section 158. Based on the measured CIR, CQI determining section 158 determines downlink transmission rate information (CQI) enabling reception in the apparatus 150 to output to transmission frame generating section 161. In addition, CQI may be determined from other information except CIR. For example, SIR may be measured to determine CQI from the measured SIR.

Meanwhile, transmission frame generating section 161 generates a transmission frame from transmission data to output to modulation section 162. At this point, the CQI output from CQI determining section 158 is embedded in the transmission frame as well as the transmission data. Modulation section 162 modulates the transmission frame output from transmission frame generating section 161 to output to spreading section 163. Spreading section 163 performs spreading on the modulated signal to output to radio transmission section 164. Radio transmission section 164 performs predetermined radio processing on the spread signal, and transmits the signal to base station apparatus 100 via antenna duplexer 152 and antenna 151.

In base station apparatus 100, radio reception section 111 receives the radio signal transmitted from mobile terminal apparatus 150 via antenna 106 and antenna duplexer 105, and performs predetermined radio processing on the signal to output to despreading section 112. Despreading section 112 performs despreading on the signal output from radio reception section 111 to output to demodulation section 113. Demodulation section 113 demodulates the signal output from despreading section 112 to output to decoding section 114. Decoding section 114 decodes the demodulated signal output from demodulation section 113 and obtains received data. At this point, a soft decision value obtained in decoding is output to CQI value correcting section 115. Further, a CQI value is extracted from the decoded signal, and also output to CQI value correcting section 115.

Based on the soft decision value output from decoding section 114, CQI value correcting section 115 corrects the CQI value also output from decoding section 114, and outputs the corrected CQI value to transmission rate determining section 116. Based on the corrected CQI value, transmission rate determining section 116 determines a transmission rate of the transmission data to output to transmission frame generating section 101. Based on the transmission rate notified from transmission rate determining section 116, transmission frame generating section 101 generates a transmission frame.

One example of procedures of a method of determining a transmission rate in base station apparatus 100 will be described below with reference to FIGS. 4 and 5.

Figure 4:
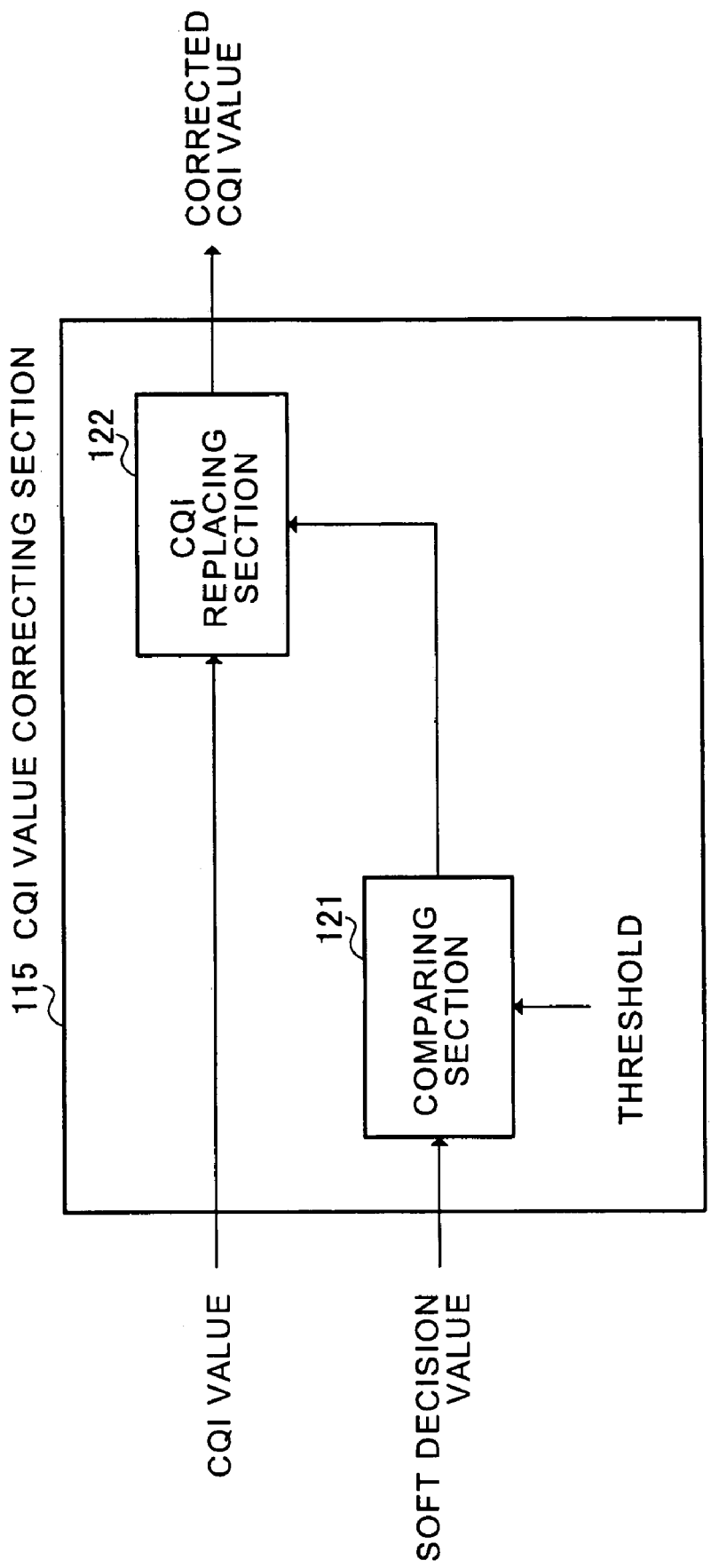
FIG. 4 is a block diagram illustrating an internal configuration of a CQI value correcting section according to Embodiment 1 of the invention.
Figure 5:
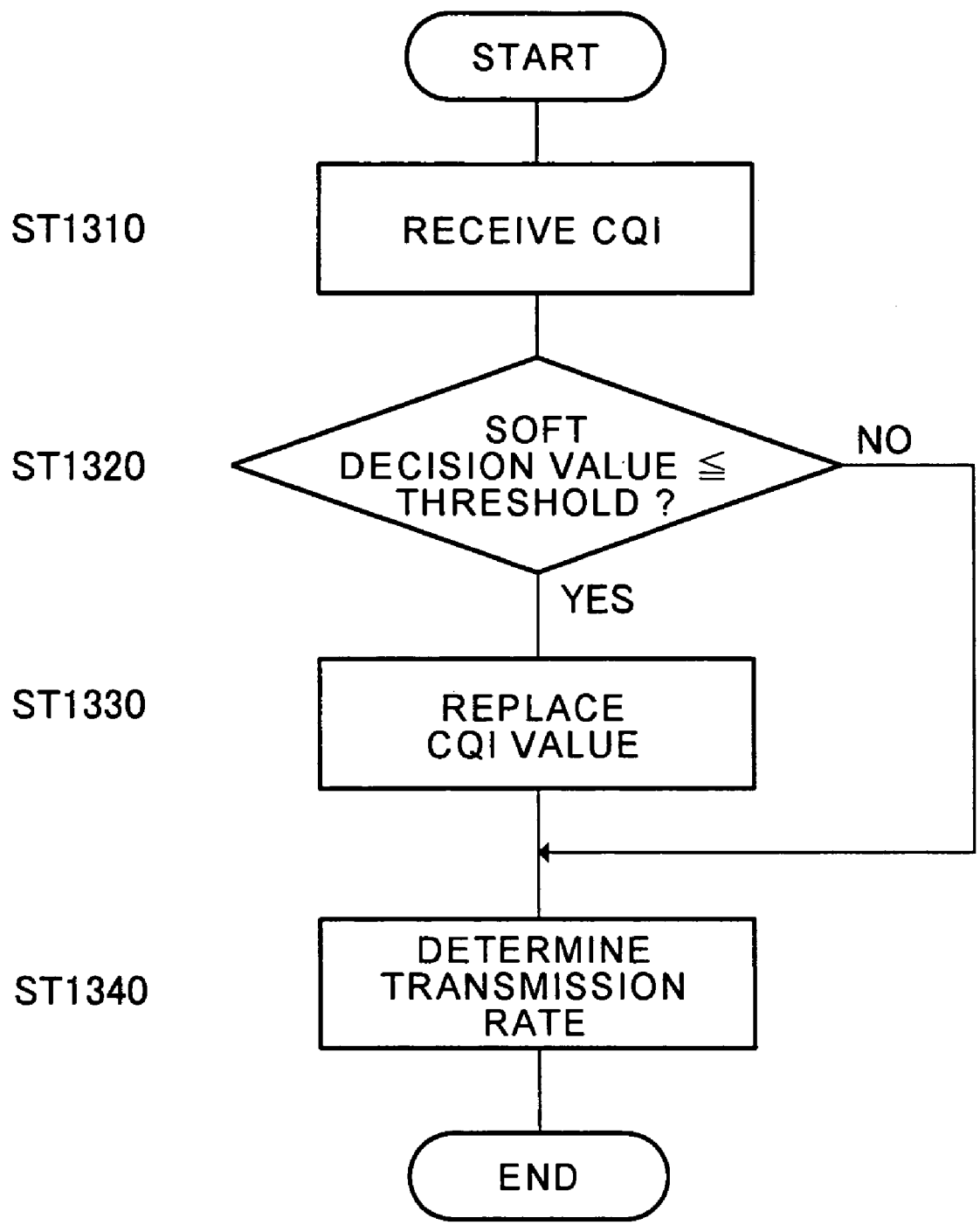
FIG. 5 is a flow diagram illustrating procedures of a method of determining a transmission rate according to Embodiment 1 of the invention.

FIG. 4 is a block diagram illustrating an internal configuration of CQI value correcting section 115. FIG. 5 is a flow diagram illustrating procedures of the method of determining a transmission rate in base station apparatus 100.

The CQI received (ST1310) via antenna 106, antenna duplexer 105 and radio reception section 111 is given predetermined processing in despreading section 112, demodulation section 113 and decoding section 114 and output to CQI value correcting section 115. CQI value correcting section 115 has comparing section 121 and CQI replacing section 122. Comparing section 121 compares the soft decision value output from decoding section 114 with a predetermined threshold (ST1320). When the soft decision value is less than or equal to the threshold, the CQI is regarded as being erroneously received, and CQI replacing section 122 corrects the CQI value output from decoding section 114 (ST1330) to output to transmission rate determining section 116. When the soft decision is more than the threshold in ST1320, CQI replacing section 122 outputs the CQI value itself output from decoding section 114 to transmission rate determining section 116. Based on the CQI value output from CQI value correcting section 115, transmission rate determining section 116 determines a transmission rate of transmission data (ST1340).

Figure 6:
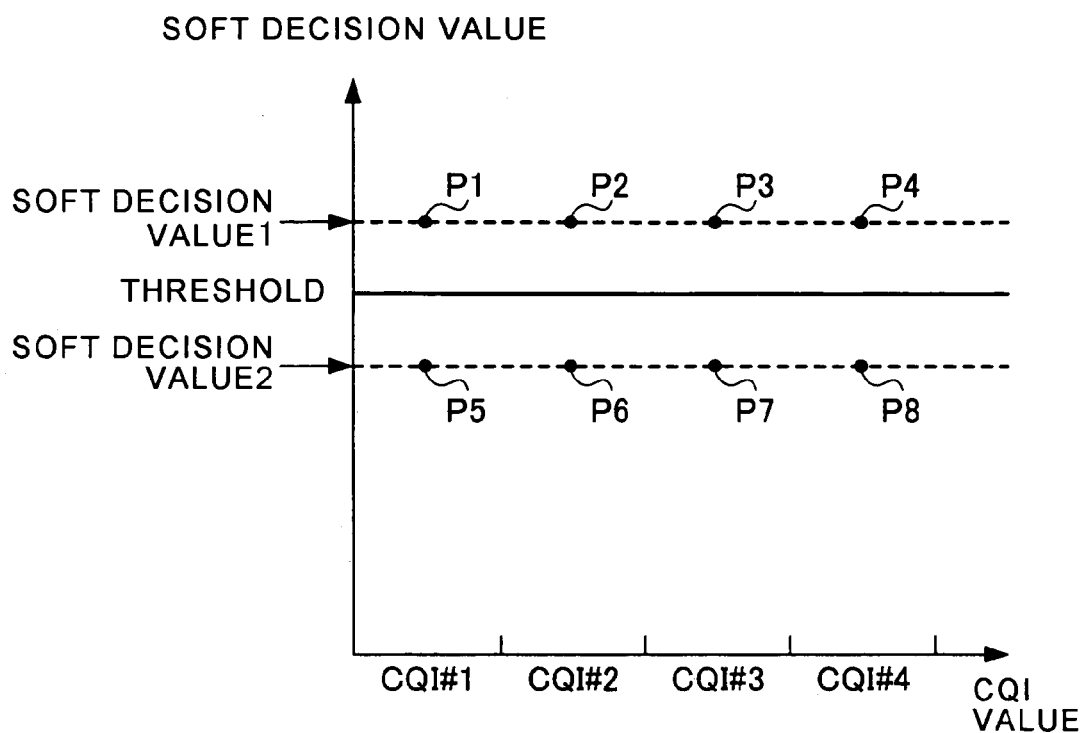
FIG. 6 is a graph to explain a method of correcting a CQI value according to Embodiment 1 of the invention.

The correction of CQI value is made as shown in FIG. 6. As an example, a case is described herein that CQI takes four values, CQI#1 to #4. When the soft decision value output from decoding section 114 is soft decision value 1 as shown by P1, P2, P3 and P4, since the soft decision value is larger than the threshold, correction is not made to the CQI value. Meanwhile, when the soft decision value is soft decision value 2 as shown by P5, P6, P7 and P8, since the soft decision value is smaller than the threshold, correction is made to the CQI value. By the correction to the CQI value, the current CQI value is replaced with a CQI value lower than the current CQI value by some steps. For example, in the setting to replace a CQI value with a one-step lower CQI value, by the correction to the CQI value, CQI#3 for P7 is replaced with CQI#2, and CQI#2 for P6 is replaced with CQI#1.

Figure 7:
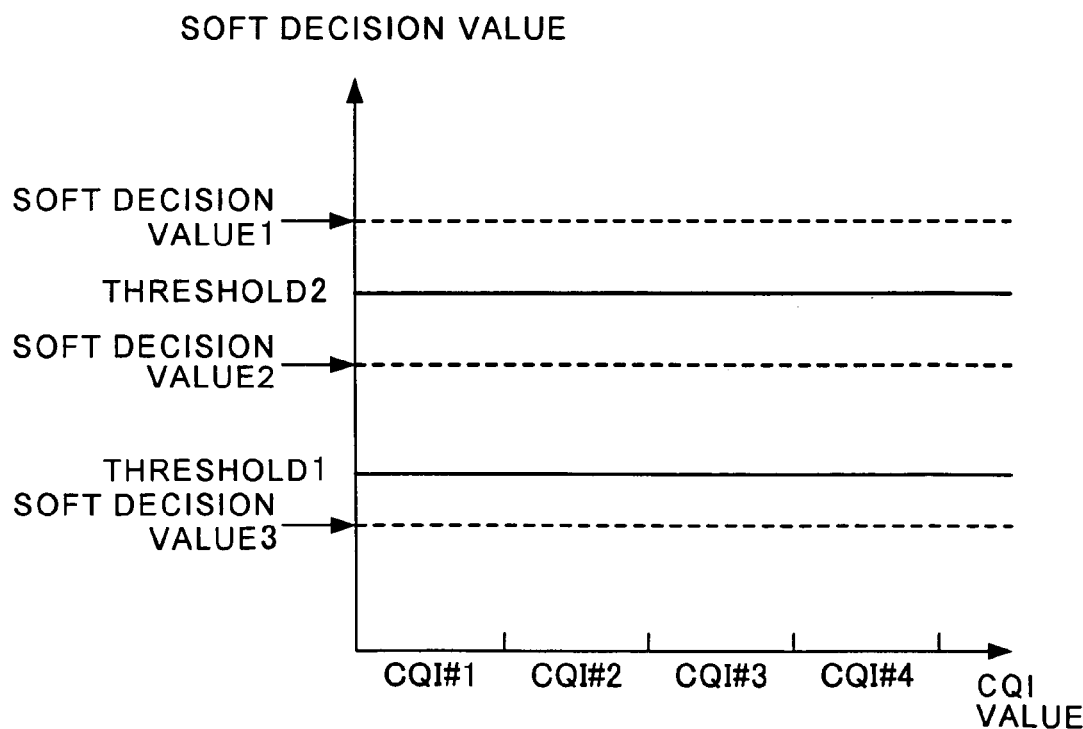
FIG. 7 is another graph to explain the method of correcting a CQI value according to Embodiment 1 of the invention.

In addition, although the case is described herein as an example where a correction width of the CQI value is constant irrespective of a level of the soft decision value, the correction width may be made variable corresponding to the soft decision value. For example, as shown in FIG. 7, it may be possible that when a soft decision value is soft decision value 2, since the soft decision value is smaller than threshold 2 and larger than threshold 1, the CQI value is replaced with a value smaller by one step, and that when a soft decision value is soft decision value 3, since the soft decision value is smaller than threshold 1, the CQI value is replaced with a value smaller by two steps. It is thereby possible to correct the CQI value to a further lower value when the soft decision value is low.

Thus, according to this Embodiment, the base station apparatus regards the CQI as being erroneously received when a soft decision value is lower than a threshold, replaces the decoded CQI value with a CQI value lower than the decoded value, and transmits downlink data at a low transmission rate determined from the lower CQI, whereby the mobile terminal apparatus is capable of meeting the predetermined quality required of the low transmission rate, and receiving the data without error. Further, by this means, it is considered decreasing the number of times the mobile terminal apparatus requests retransmission of data, whereby decreases in throughput can be prevented which are caused by the originally low CQI being erroneously received as a high CQI. Furthermore, since the main operation is making a determination using thresholds, it is possible to implement the CQI correction operation in a simplified configuration. Moreover, the correction method can be varied optionally by only changing the threshold, and therefore, the adjustment of the correction method is also easy.

Particularly, the soft decision value is directly used as likelihood of HS-DPCCH (Dedicated Physical Control Channel (uplink) for HS-DSCH) used in transmitting the CQI, and therefore, reflects the reliability of the received CQI accurately.

Further, when the soft decision value is less than or equal to the threshold, it may be possible regarding the CQI as being erroneously received, and assigning a low priority or not assigning a priority to a mobile terminal apparatus transmitting the CQI in scheduling of packet transmission.

In this way, when the reliability of received CQI is poor, communications are reduced or halted, and it is thus possible to prevent decreases in throughput of the entire communication system.

Embodiment 2

Figure 8:
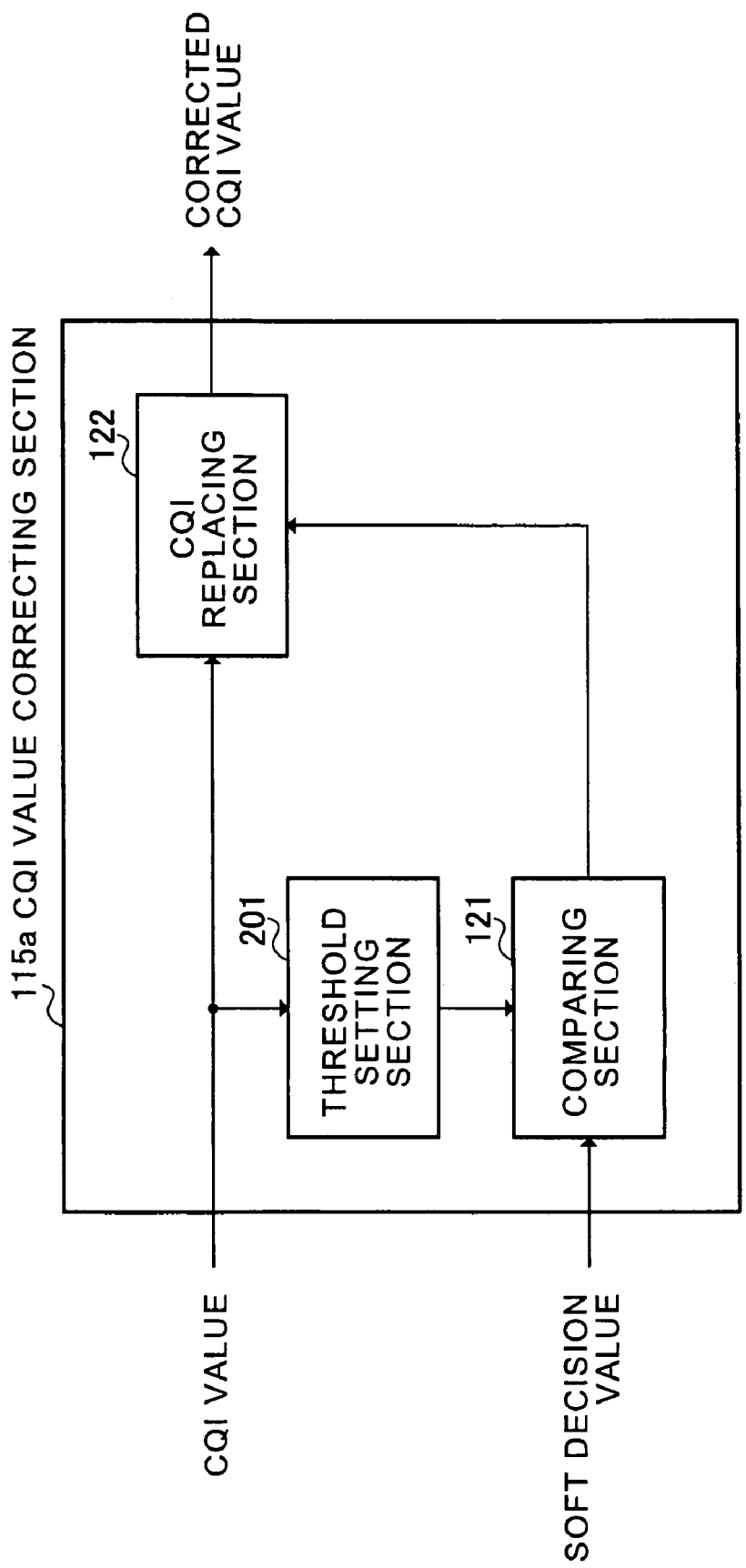
FIG. 8 is a block diagram illustrating a configuration of a CQI value correcting section according to Embodiment 2 of the invention.

A base station apparatus according to Embodiment 2 of the invention has the same configuration as that of base station apparatus 100 as shown in FIG. 2 except CQI value correcting section 115a, and only a configuration of the section 115a different from that in Embodiment 1 is shown in FIG. 8. In addition, the same structural elements as in CQI value correcting section 115 as shown in FIG. 4 are assigned the same reference numerals, and descriptions thereof are omitted.

It is a feature of this Embodiment determining a threshold used in making a determination on likelihood of received data with the threshold based on a CQI value. In other words, a level of originally received CQI value is considered in correcting the CQI value based on the likelihood of received data. When the base station apparatus receives a high CQI from the mobile terminal apparatus, a downlink transmission rate is set high due to the high CQI. Accordingly, when the base station apparatus erroneously receives a low CQI as a high CQI although the mobile terminal apparatus transmits the low CQI, larger effects are imposed on the throughput of the entire communication system.

Therefore, in this Embodiment, in correcting a CQI value based on likelihood of received data, when an originally received CQI value is high, the CQI is corrected lower in consideration of effects on the throughput of the communication system to maintain good communication environments.

Figure 9:
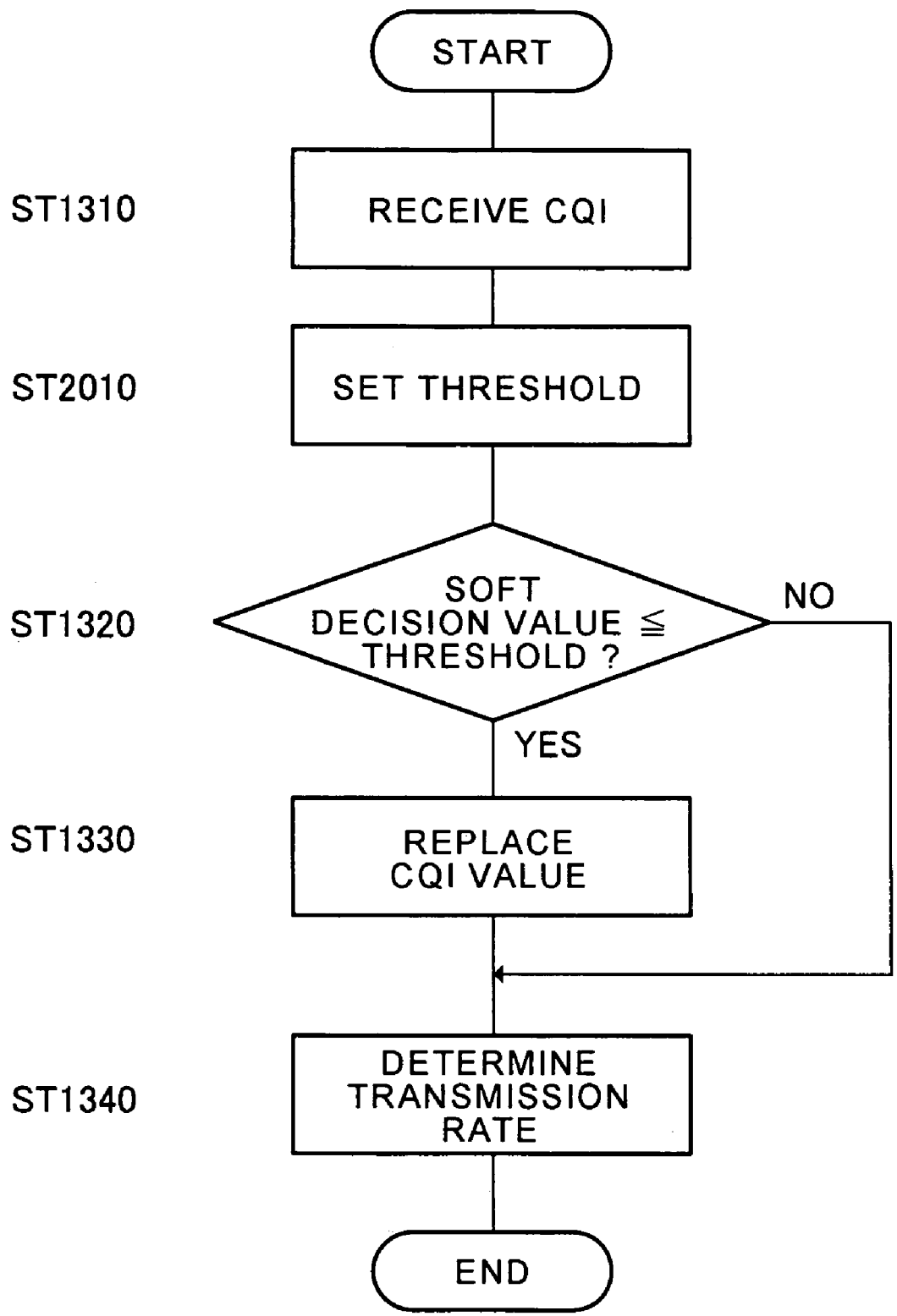
FIG. 9 is a flow diagram illustrating procedures of a method of determining a transmission rate according to Embodiment 2 of the invention.

In FIG. 8, threshold setting section 201 has a table storing the correspondence relationship between the CQI value and threshold, and selects a threshold corresponding to the CQI value output from decoding section 114 to output to comparing section 121. The other operation is the same as in Embodiment 1. FIG. 9 is a flow diagram illustrating procedures of the transmission rate determining method. As shown in the figure, this method is different in step ST2010 from the transmission rate determining method as shown in FIG. 5.

Figure 10:
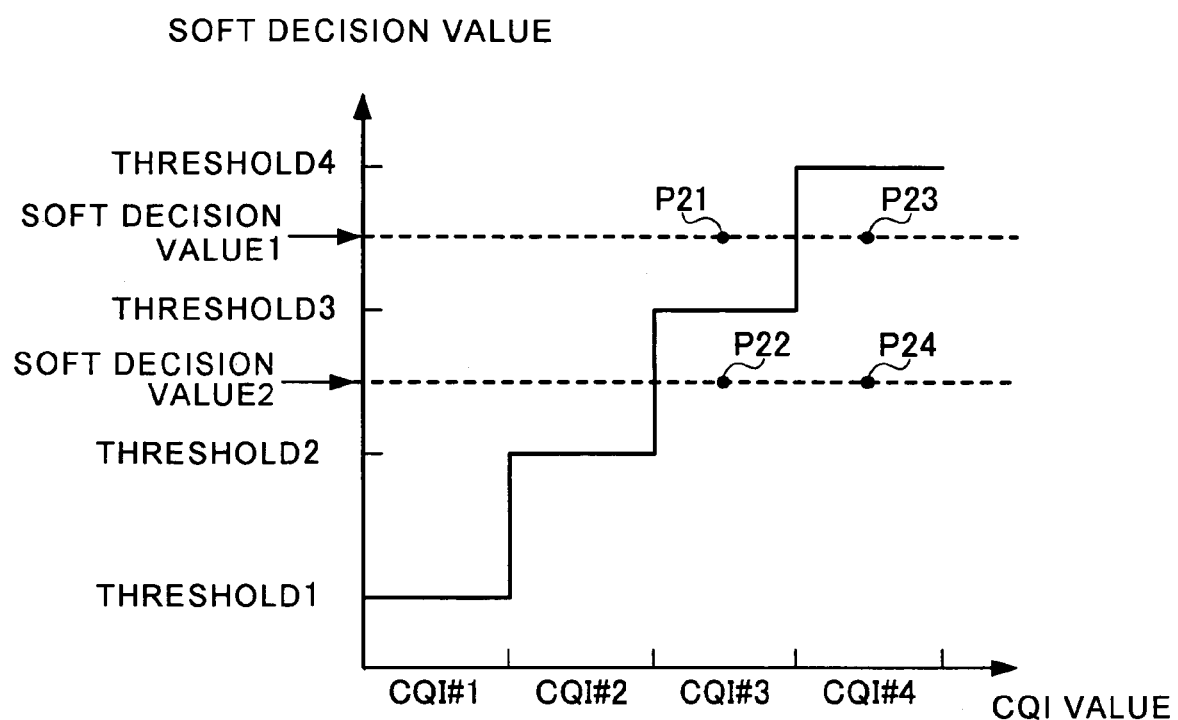
FIG. 10 is a graph to explain a method of correcting a CQI value according to Embodiment 2 of the invention.

Referring to FIG. 10, described below is correction of CQI value performed in transmission rate determination in the base station apparatus with the aforementioned configuration. As an example, a case is described herein that CQI takes four values, CQI#1 to #4.

A plurality of thresholds is set in the table stored in threshold setting section 201 corresponding to CQI values output from decoding section 114. More specifically, thresholds 1, 2, 3 and 4 are set respectively corresponding to CQI #1, #2, #3 and #4. In other words, when the CQI value is a high CQI, the threshold is set higher, while when the CQI value is a low CQI, the threshold is set lower. Then, comparing section 121 compares the soft decision value output from decoding section 114 with the threshold. When the soft decision value is lower than the threshold, it is assumed that the CQI is erroneously received, the CQI value output from decoding section 114 is replaced with a low CQI value, and the replaced value is output to transmission rate determining section 116. When the soft decision value is larger than the threshold, the CQI value output from decoding section 114 is output to transmission rate determining section 116 without being replaced.

For example, when the CQI value output from decoding section 114 is CQI#3 (P21 and P22), threshold 3 is applied as a threshold. When the soft decision value output from decoding section 114 is soft decision value 1 (P21), since the soft decision value is larger than threshold 3, the correction is not made to the CQI value. Meanwhile, when the soft decision value is soft decision value 2 (P22), since the soft decision value is smaller than threshold 3, the correction is made to the CQI value. When the CQI value output from decoding section 114 is CQI#4 (P23 and P24), threshold 4 is applied as a threshold, and the correction is made to the CQI value in either case that the soft decision value output from decoding section 114 is soft decision value 1 or soft decision value 2, since these are smaller than threshold 4. In addition, the correction is made in the same method as in Embodiment 1.

Thus, according to this Embodiment, since the threshold is set higher as the decoded CQI value is higher, even when the base station apparatus erroneously receives the CQI transmitted from the mobile terminal apparatus as a high CQI, it is possible to control a downlink transmission rate within a suitable range, and to prevent decreases in throughput of the entire communication system. Further, according to this method, the operation is made possible of correcting the CQI while concurrently considering two parameters, likelihood of received data and the CQI. Furthermore, since the main operation is making a determination using thresholds, it is possible to implement the above-mentioned operation in a simplified configuration. Moreover, the correction method can be varied optionally by only changing the threshold, and therefore, the adjustment of the correction method is also easy.

Figure 11:
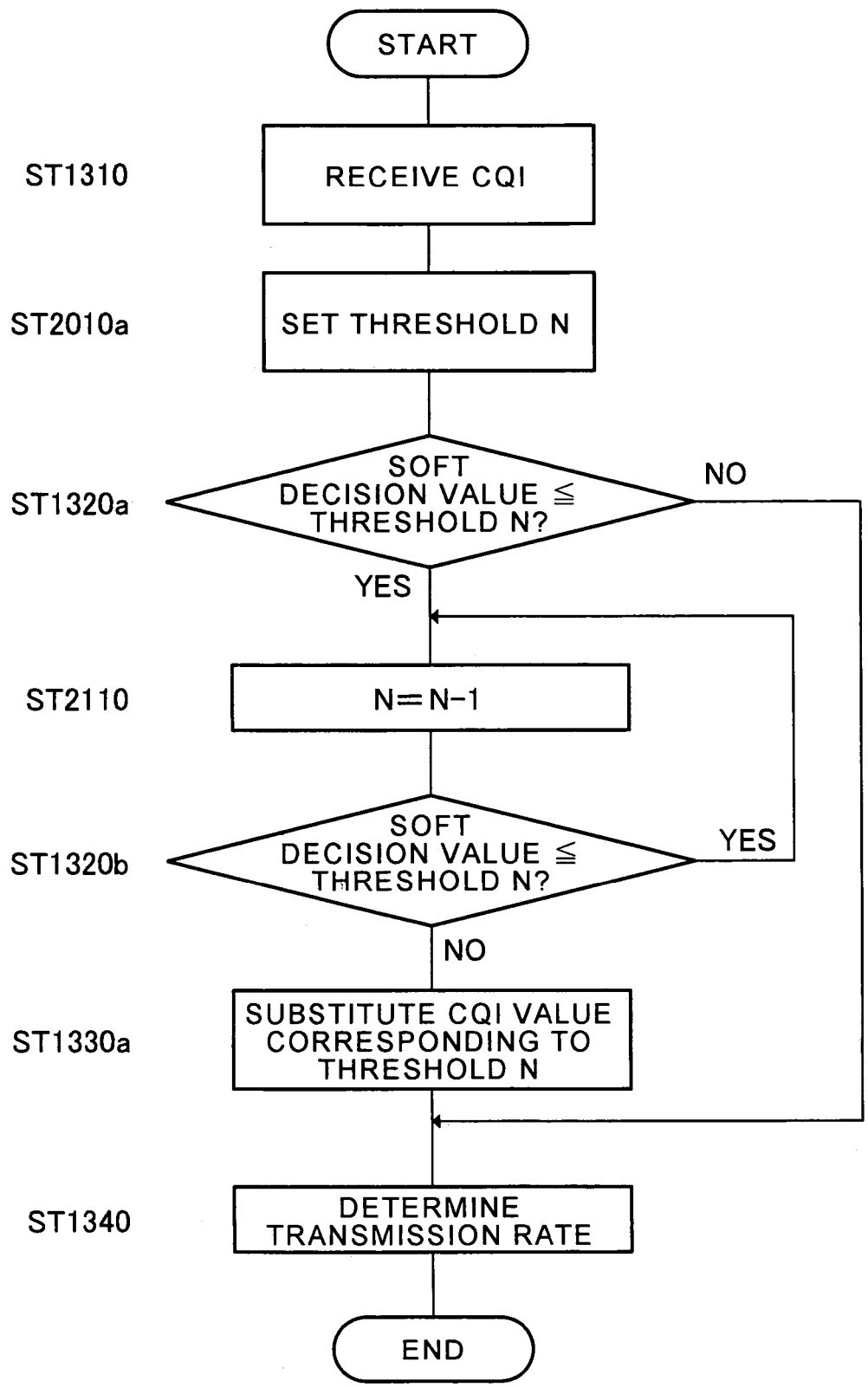
FIG. 11 is a flow diagram of summarized procedures of the method of determining a transmission rate according to Embodiment 2 of the invention.

In addition, although the case is explained as an example that a correction width of CQI value (degree of correction) is constant, the correction width may be made variable corresponding to a level of the soft decision value. For example, when the soft decision value is n, the CQI value is corrected to a CQI value corresponding to the maximum threshold among thresholds smaller than n. For example, in FIG. 10, when the CQI value is CQI#4 and the soft decision value is soft decision value 1 (P23), the CQI value is corrected to CQI#3 corresponding to threshold 3 that is the maximum threshold among thresholds smaller than soft decision value 1. Meanwhile, when the CQI value is CQI#4 and the soft decision value is soft decision value 2 (P24), the CQI value is corrected to CQI#2 corresponding to threshold 2 that is the maximum threshold among thresholds smaller than soft decision value 2. The correction width of the CQI value is thus varied corresponding to the level of the soft decision value. FIG. 11 shows a flow diagram of summarized procedures of this transmission rate determining method. In addition, the same steps as in the transmission rate determining method as shown in FIG. 9 are assigned marks with the same numbers and alphabets.

Figure 12:
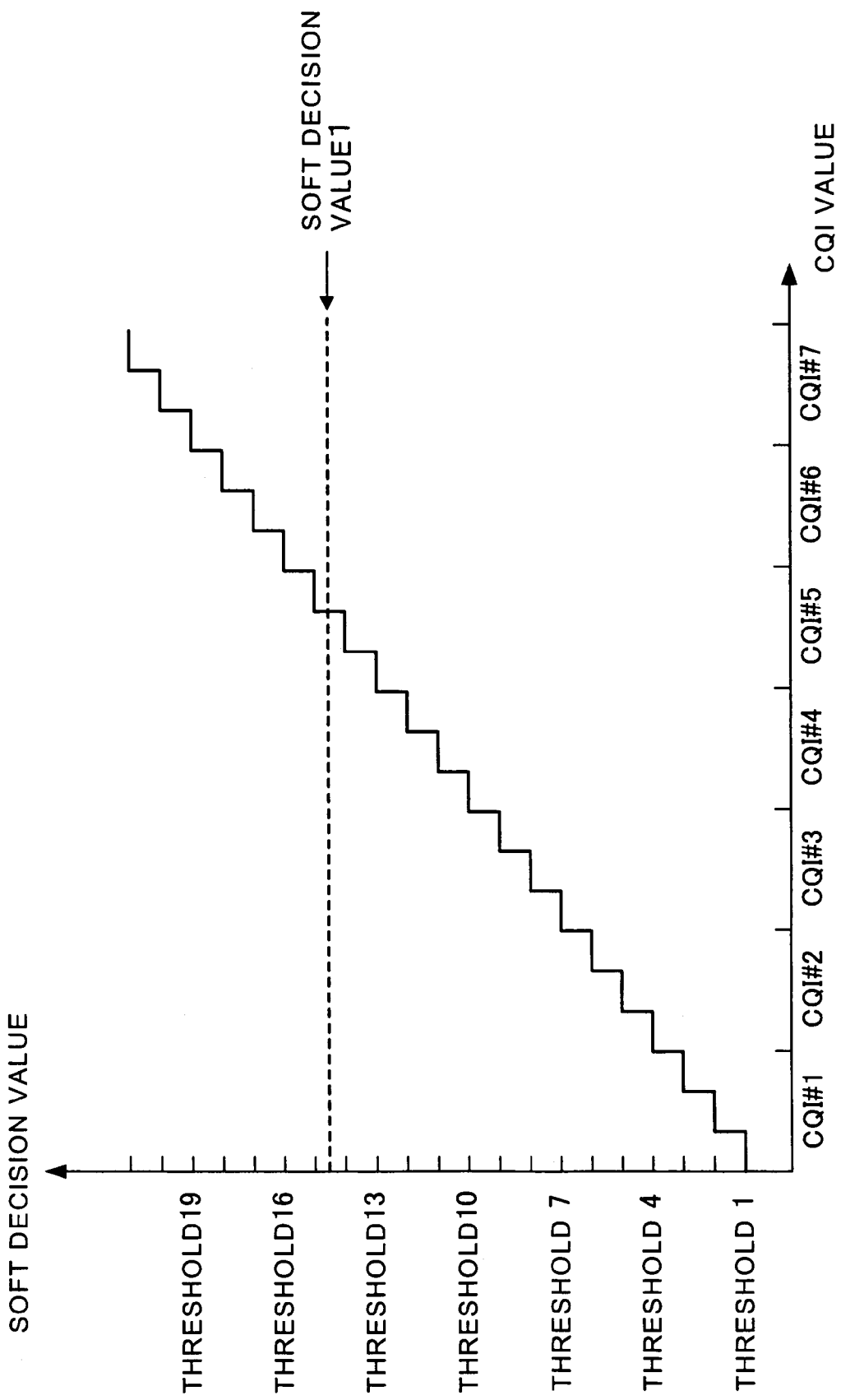
FIG. 12 is another graph to explain the method of correcting a CQI value according to Embodiment 2 of the invention.

Further, although the case is described herein as an example that one CQI value is set for one threshold, as shown in FIG. 12, one CQI may be set for a plurality of thresholds. In FIG. 12, CQI takes seven values, CQI#1 to CQI#7, and one CQI is set for three thresholds. For example, thresholds 13, 14 and 15 are set corresponding to CQI#5. Then, different CQI correction schemes are determined for each threshold such that the CQI value is corrected and decreased by two steps when the soft decision value is less than or equal to threshold 15 (more than threshold 14), the CQI value is corrected and decreased by three steps when the soft decision value is less than or equal to threshold 14, and that the CQI value is corrected and decreased by four steps when the soft decision value is less than or equal to threshold 13. It is thereby possible to adjust the correction of CQI value finely. For example, when the CQI value is CQI#5 and the soft decision value is soft decision value 1, since the soft decision value is less than threshold 15, the CQI value is decreased by two steps and corrected to CQI#3.

Furthermore, when a value of the received CQI is small, since the effect on the communication system is small, any corrections may not be made to the CQI. The processing for determining a transmission rate can thereby be simplified.

Embodiment 3

Figure 13:
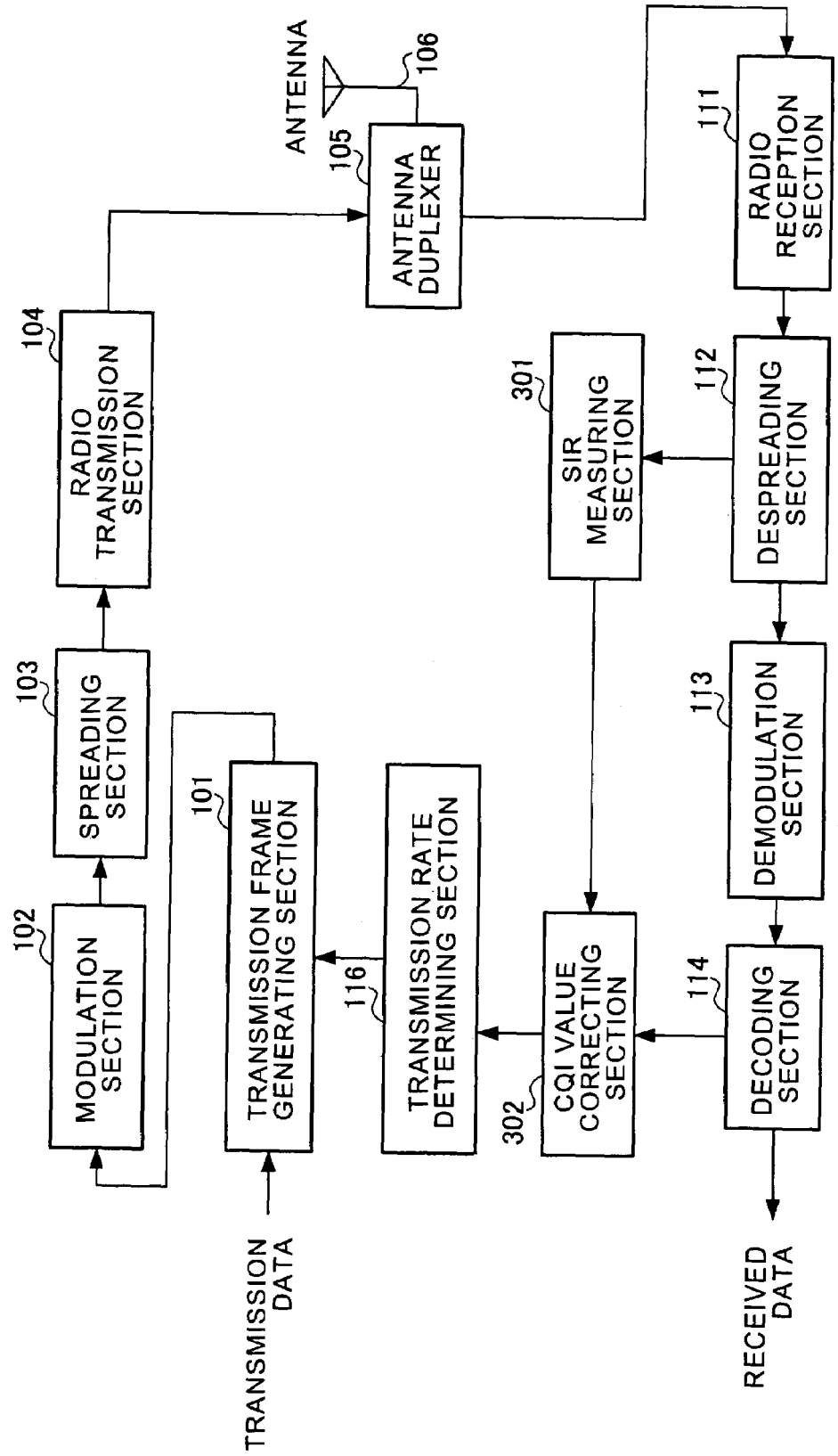
FIG. 13 is a block diagram illustrating a configuration of a base station apparatus according to Embodiment 3 of the invention.

FIG. 13 is a block diagram illustrating a configuration of base station apparatus 300 according to Embodiment 3 of the invention. In addition, the base station apparatus has a basic configuration similar to that of base station apparatus 100 as shown FIG. 2, and the same structural elements are assigned the same reference numerals to omit descriptions thereof.

It is a feature of this Embodiment using SIR (Signal-to-Interference Ratio) of a signal received in the base station apparatus.

In FIG. 13, SIR measuring section 301 measures reception SIR from despread data output from despreading section 112 to output to CQI value correcting section 302. Corresponding to the CQI value output from decoding section 114, CQI value correcting section 302 sets a threshold higher when the CQI value is a high CQI, while setting a threshold lower when the CQI value is a low CQI. Then, the section 302 compares the threshold with the reception SIR output from SIR measuring section 301. When the reception SIR is less than or equal to the threshold, the section 302 regards the CQI as being erroneously received, and replaces the CQI value output from decoding section 114 with a lower CQI value to output to transmission rate determining section 116. Further, when the reception SIR is more than the threshold, the section 302 outputs the CQI value output from decoding section 114 to transmission rate determining section 116 without replacing.

Figure 14:
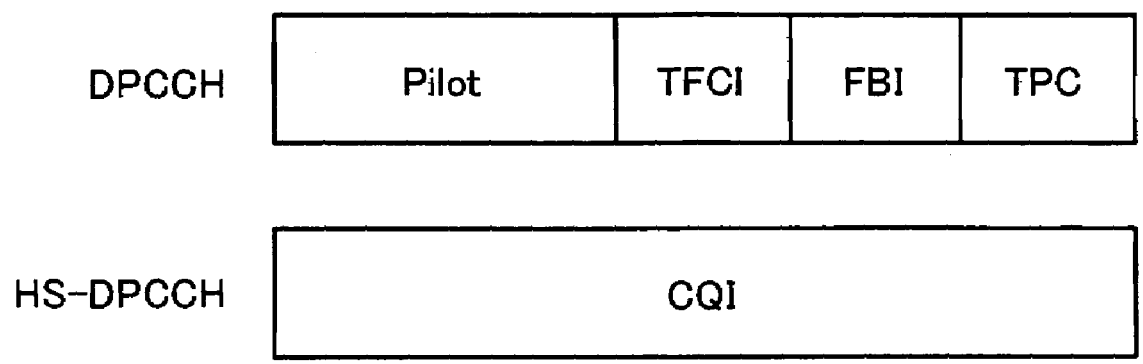
FIG. 14 is a diagram illustrating a frame structure of HS-DPCCH.

FIG. 14 illustrates a fame structure of HS-DPCCH. HS-DPCCH used in transmitting the CQI is code-multiplexed with DPCCH and transmitted from the mobile terminal apparatus. SIR measuring section 301 measures the SIR using the strength of a pilot signal of DPCCH. Accordingly, SIR measuring section 301 does not obtain the SIR of CQI (HS-DPCCH). However, HS-DPCCH and DPCCH are transmitted at the same time in code-multiplexing, and the power of HS-DPCCH is subjected to transmission control with an offset of a fixed value with respect to DPCCH, whereby the SIR can be assumed to represent likelihood of the CQI.

Thus, according to this Embodiment, the base station apparatus regards the CQI as being erroneously received when the reception SIR is lower than or equal to a threshold, replaces the CQI value with a value lower than the decoded CQI value, and transmits downlink data at a transmission rate lower than that determined from the CQI, whereby the mobile terminal is capable of meeting the predetermined quality required of the low transmission rate, and receiving data without error. Further, at this time, the mobile terminal does not request retransmission, and therefore, decreases in throughput can be prevented which are caused by the low CQI being erroneously received as a high CQI.

Moreover, the SIR can be assumed as likelihood of HS-DPCCH for use in transmitting the CQI, and the likelihood is obtained using a pilot of known bits on DPCCH. It is thus possible to obtain the likelihood with more accuracy than that of the soft decision value, and judge erroneous reception of CQI with reliability.

Figure 15:
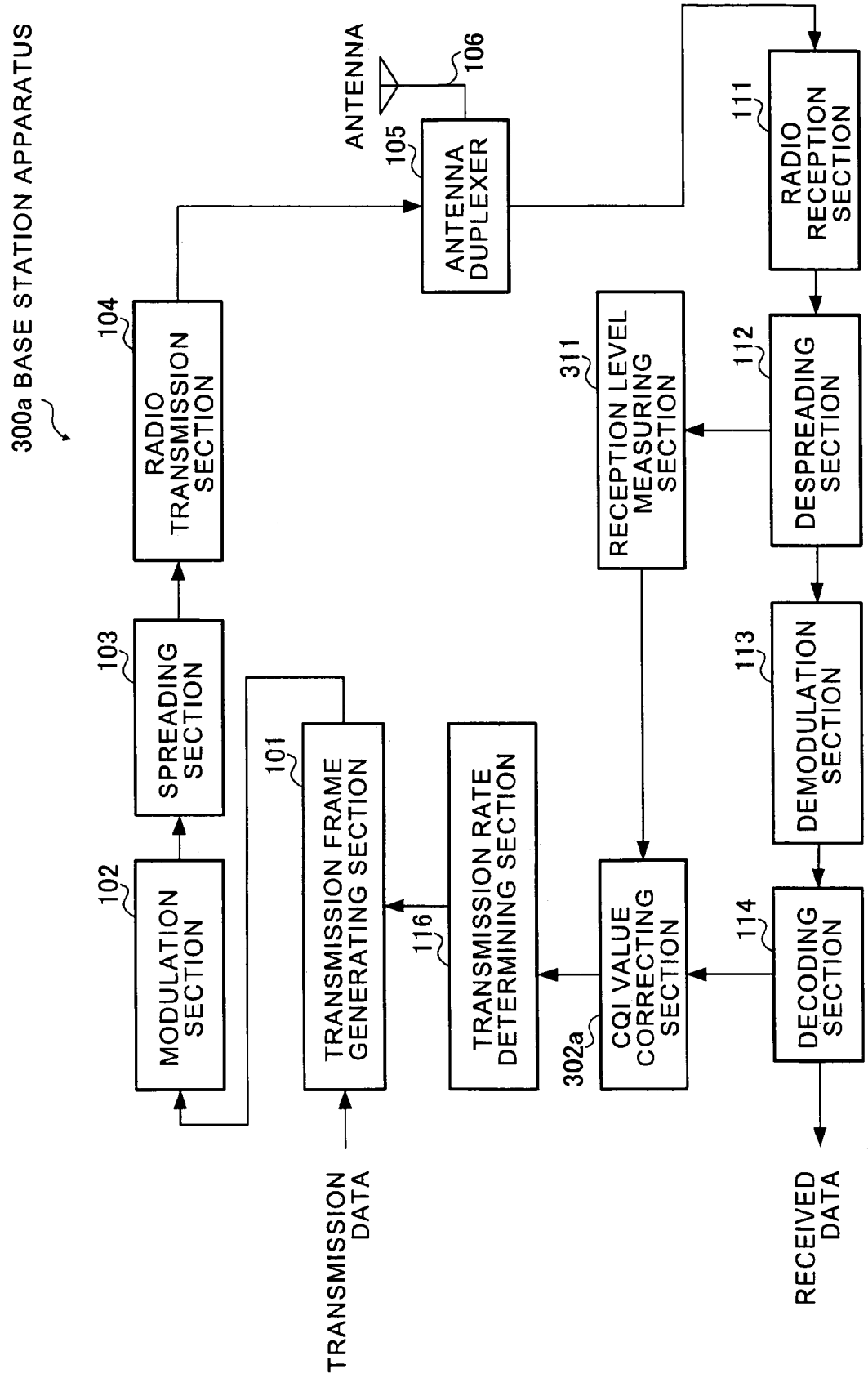
FIG. 15 is a block diagram illustrating another configuration of the base station apparatus according to Embodiment 3 of the invention.

In addition, although the case is described herein as an example of using SIR as likelihood of received data, not limiting to SIR, other reception quality may be used such as CIR (Carrier to Interference Ratio) and RSSI (Received Signal Strength Indicator). Further, as shown in FIG. 15, a power level (reception level) of a received signal may be used as likelihood of received data. Reception level measuring section 311 in base station apparatus 300a measures a reception level from despread data output from despreading section 112 to output to CQI value correcting section 302a. The other operation is the same as that described previously.

Further, Embodiments 1, 2 and 3 may be combined. In other words, the soft decision value, reception SIR and reception level may be combined as the likelihood to correct a CQI value.

Embodiment 4

Figure 16:
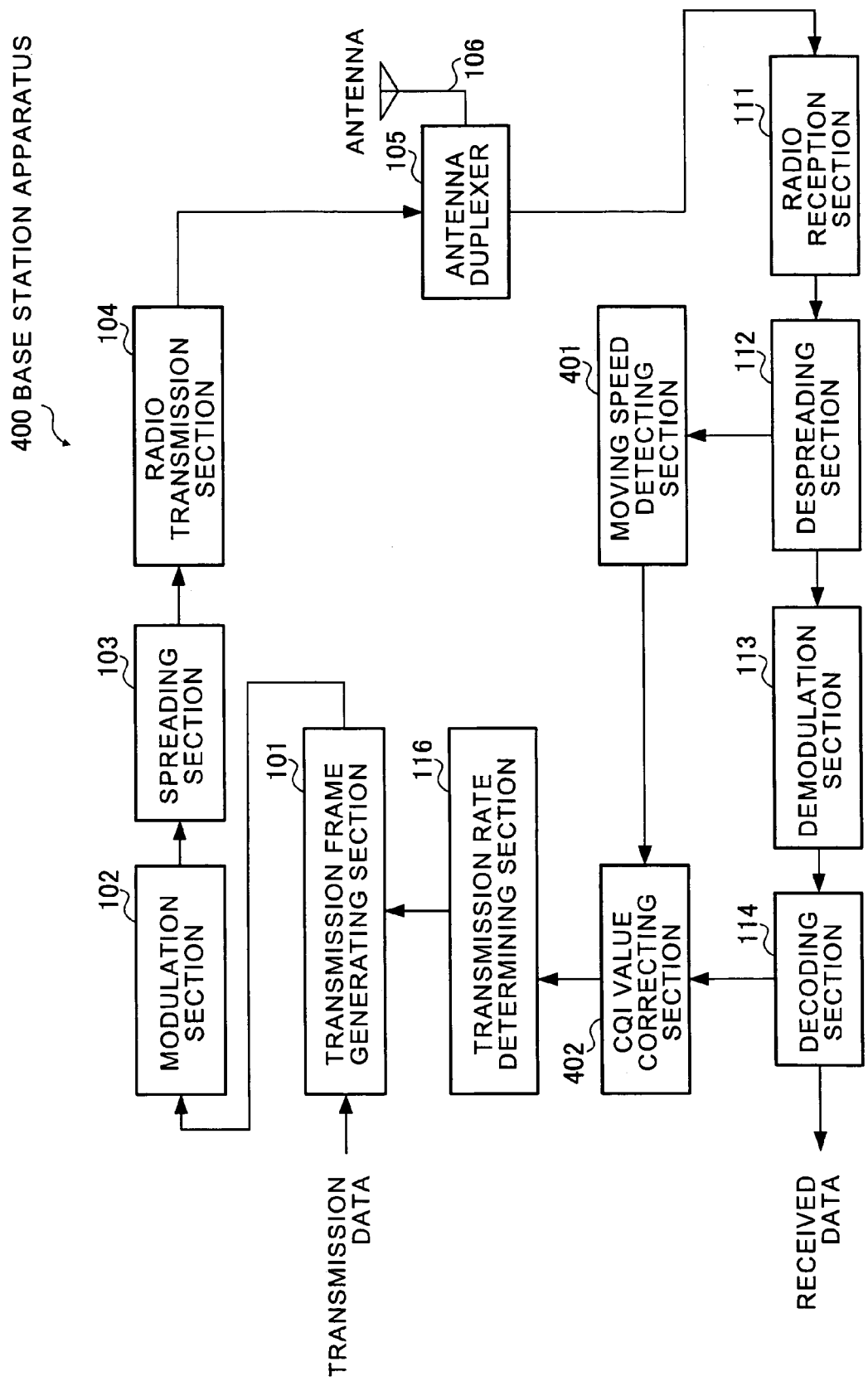
FIG. 16 is a block diagram illustrating a configuration of a base station apparatus according to Embodiment 4 of the invention.

FIG. 16 is a block diagram illustrating a configuration of base station apparatus 400 according to Embodiment 4 of the invention. In addition, the base station apparatus has a basic configuration similar to that of base station apparatus 100 as shown FIG. 2, and the same structural elements are assigned the same reference numerals to omit descriptions thereof.

It is a feature of this Embodiment detecting the moving speed of a mobile terminal apparatus and corresponding to the result, providing a threshold with an offset.

In FIG. 16, moving speed detecting section 401 divides a known symbol (pilot symbol) from despread data output from despreading section 112, obtains how much a phase of a current known symbol is rotated with respect to a phase of the last known symbol, and from this rotation, detects the moving speed of the mobile terminal apparatus to output to CQI value correcting section 402. When the moving speed is high, it is predicted that reception performance is poorer than that in low moving speed even in the same soft decision value. Therefore, CQI value correcting section 402 sets the threshold higher than in low moving speed. The other operation is the same as that as described previously.

Thus, according to this Embodiment, the correction of CQI is made in consideration of also the moving speed such as adding an offset to the threshold corresponding to the moving speed of the mobile terminal apparatus, and it is thus possible to judge erroneous reception of CQI with more reliability and reduce an error rate of received data in the mobile terminal apparatus.

In addition, this Embodiment may be combined with Embodiments 1, 2 and 3. In other words, the threshold may be provided with an offset corresponding to the moving speed when the reception SIR or reception level is used as likelihood of received data.

The transmission rate determining method according to the invention is not limited to the base station apparatus, and applicable to radio communication apparatuses that determine a transmission rate of transmission data using CQI (or information of the similar concept), and it is thus possible to provide the radio communication apparatuses with the same advantages as described above.

Further, from the viewpoint of simplifying the apparatus, the case is mainly described herein that the correction of CQI is made using a determination with thresholds, but the same operation may be performed using another method. For example, a correction method (rule) may be determined with arithmetic equation, or stored beforehand in a data table.

As described above, according to the invention, even when a base station apparatus erroneously receives CQI transmitted from a mobile terminal apparatus, the mobile terminal apparatus can be prevented from erroneously receiving data transmitted from the base station, and it is possible to maintain the throughput of the entire communication system.

This application is based on the Japanese Patent Application No.2003-031539 filed on Feb. 7, 2003, entire content of which is expressly incorporated by reference herein.

INDUSTRIAL APPLICABILITY

The present invention is applicable to a radio transmission apparatus used in a wireless communication system for performing high-speed packet transmission, and to a method of determining a downlink transmission rate used in the apparatus.

The invention claimed is:

1. A radio transmission apparatus that determines a transmission rate in transmitting data, based on a CQI (Channel Quality Indicator)
transmitted from a communication apparatus that is a transmission destination of the data, comprising:
a receiver that receives a signal including the CQI transmitted from the communication apparatus;

a corrector that corrects the CQI included in the signal, based on likelihood of the signal including the CQI; and a transmission rate determiner that determines a transmission rate in transmitting data to the communication apparatus, based on the corrected CQI.

2. The radio transmission apparatus according to claim 1, wherein based on the likelihood, the corrector determines a degree of correction of the CQI.

3. The radio transmission apparatus according to claim 1, wherein the corrector corrects the CQI based on a value of the CQI in addition to the likelihood.

4. The radio transmission apparatus according to claim 3, wherein the corrector decreases the CQI more than or equal to a predetermined value to correct.

5. The radio transmission apparatus according to claim 1, wherein the corrector corrects the CQI based on moving speed of the communication apparatus in addition to the likelihood.

6. The radio transmission apparatus according to claim 1, wherein when the likelihood is less than or equal to a threshold, the corrector decreases CQI to correct.

7. The radio transmission apparatus according to claim 6, wherein as a value of the CQI is higher, the threshold is set higher.

8. The radio transmission apparatus according to claim 6, wherein a value of the CQI is set for a plurality of thresholds.

9. The radio transmission apparatus according to claim 6, wherein as moving speed of the communication apparatus is higher, the threshold is set higher.

10. The radio transmission apparatus according to claim 1, wherein the radio transmission apparatus performs scheduling in transmitting packets to a plurality of communication apparatuses, and decreases a transmission assignment priority or does not assign transmission to the communication apparatus subject to correction of the CQI.

11. The radio transmission apparatus according to claim 1, wherein used as the likelihood is a soft decision value, reception quality, or a reception power level of the signal including the CQI transmitted from the communication apparatus.

12. A base station apparatus comprising the radio transmission apparatus according to claim 1.

13. A mobile terminal apparatus comprising the radio transmission apparatus according to claim 1.

14. A transmission rate determining method for determining a transmission rate in transmitting a radio signal of data based on a CQI transmitted from a radio communication apparatus that is a transmission destination of the data, comprising:

a reception step of receiving a signal including the CQI transmitted from the radio communication apparatus;

a correcting step of correcting the CQI included in the signal based on likelihood of the signal including the CQI; and a transmission rate determining step of determining a transmission rate in transmitting a radio signal of data to the radio communication apparatus, based on the corrected CQI.

15. A transmission rate determining program for determining a transmission rate in transmitting a radio signal of data based on a CQI transmitted from a radio communication apparatus that is a transmission destination of the data, the program making a computer execute:

a reception step of receiving a signal including the CQI transmitted from the radio communication apparatus;

a correcting step of correcting the CQI included in the signal based on likelihood of the signal including the CQI; and a transmission rate determining step of determining a transmission rate in transmitting a radio signal of data to the radio communication apparatus, based on the corrected CQI.

* * * * *